(12) United States Patent
Croy et al.

(10) Patent No.: US 12,208,936 B2
(45) Date of Patent: Jan. 28, 2025

(54) PROFILE ARM TECHNOLOGY

(71) Applicant: Automatic Handling International, Inc., Erie, MI (US)

(72) Inventors: R. Scott Croy, Ida, MI (US); Craig Reed, Monroe, MI (US)

(73) Assignee: Automatic Handling International, Inc., Erie, MI (US)

( * ) Notice: Subject to any disclaimer, the term of this patent is extended or adjusted under 35 U.S.C. 154(b) by 508 days.

(21) Appl. No.: 17/673,956

(22) Filed: Feb. 17, 2022

(65) Prior Publication Data
US 2022/0267042 A1    Aug. 25, 2022

Related U.S. Application Data

(60) Provisional application No. 63/153,618, filed on Feb. 25, 2021.

(51) Int. Cl.
*G01B 21/20* (2006.01)
*B65B 57/00* (2006.01)
*B65B 69/00* (2006.01)
*G05B 19/05* (2006.01)

(52) U.S. Cl.
CPC .......... *B65B 69/0025* (2013.01); *B65B 57/00* (2013.01); *G05B 19/05* (2013.01)

(58) Field of Classification Search
CPC . G01B 5/04; G01B 5/061; G01B 5/20; G01B 5/28; G01B 21/20
USPC .......... 33/711, 730, 734, 735, 738, 772, 551
See application file for complete search history.

(56) References Cited

U.S. PATENT DOCUMENTS

| | | | | |
|---|---|---|---|---|
| 5,351,411 A * | 10/1994 | Gronskov | ............... | G01B 5/20 73/146 |
| 6,647,636 B2 * | 11/2003 | Fukuhara | ................ | G01C 7/04 33/501.02 |
| 6,668,466 B1 * | 12/2003 | Bieg | ..................... | G01B 5/008 33/503 |
| 7,032,320 B2 * | 4/2006 | Ischdonat | ............... | G01L 5/102 33/501.02 |
| 7,047,153 B2 * | 5/2006 | Woods | ................. | G01N 23/083 702/158 |
| 8,429,829 B2 * | 4/2013 | Arnold | .................. | B24B 49/045 33/555.1 |
| 8,725,446 B2 * | 5/2014 | Wegmann | ............. | G01B 5/003 702/155 |
| 9,683,914 B2 * | 6/2017 | Dietz | ..................... | G01B 5/285 |
| 9,879,969 B2 * | 1/2018 | Volk | ........................ | G01B 5/08 |
| 9,933,277 B2 * | 4/2018 | Terauchi | ................. | G01B 5/28 |
| 10,571,238 B2 * | 2/2020 | Morii | ..................... | G01B 3/008 |
| 11,454,487 B2 * | 9/2022 | Schwarzer | ............... | G01B 5/20 |
| 2022/0267111 A1 * | 8/2022 | Croy | .................... | B65H 19/126 |

* cited by examiner

*Primary Examiner* — George B Bennett
(74) *Attorney, Agent, or Firm* — MacMillan, Sobanski & Todd, LLC

(57) ABSTRACT

An automatic de-wiring machine having a profile arm is shown. The profile arm is capable of recording the contours of a bale to the de-wiring head such that the de-wiring head can adjust its position throughout the bale to fully remove wire without jamming.

4 Claims, 11 Drawing Sheets

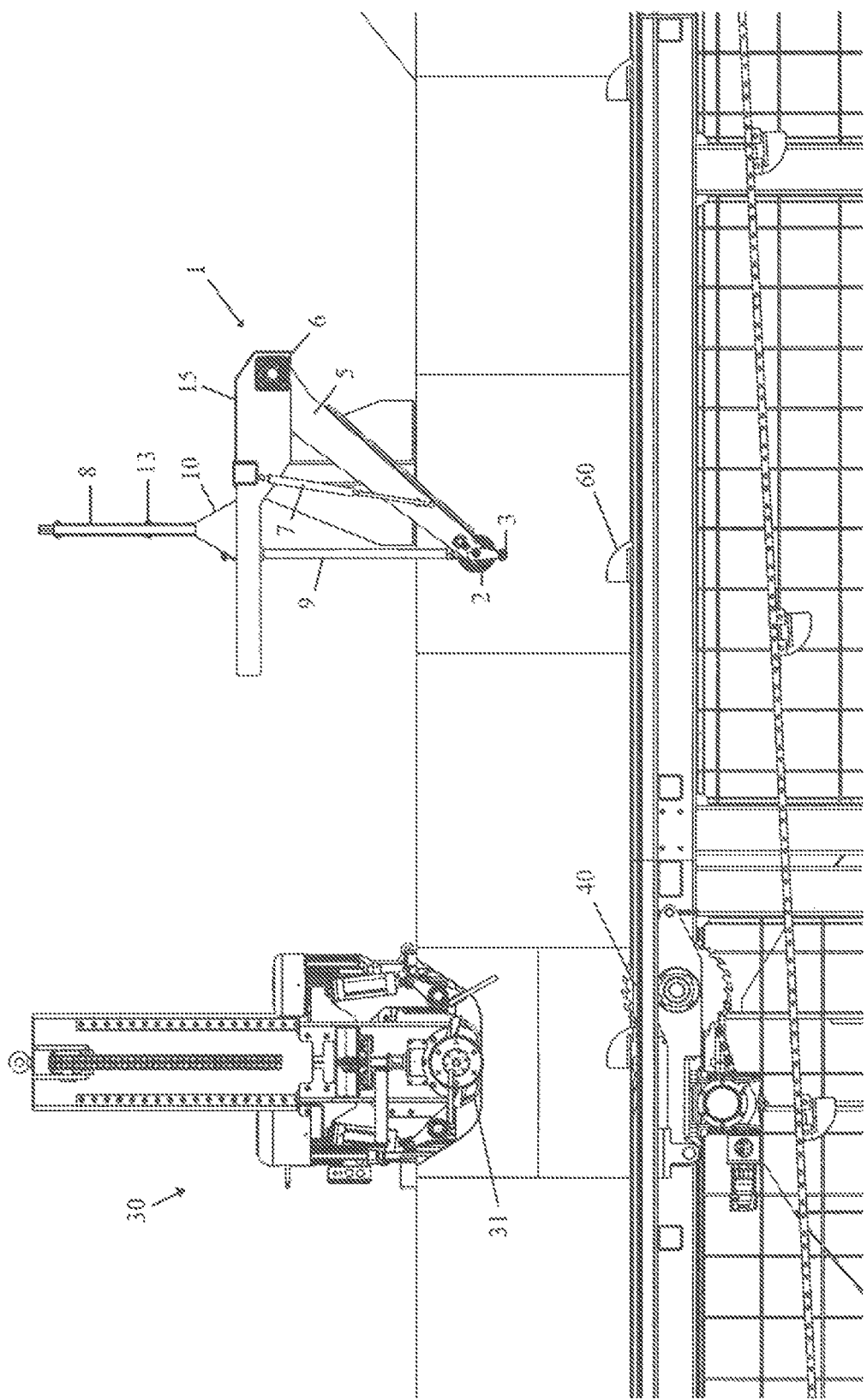

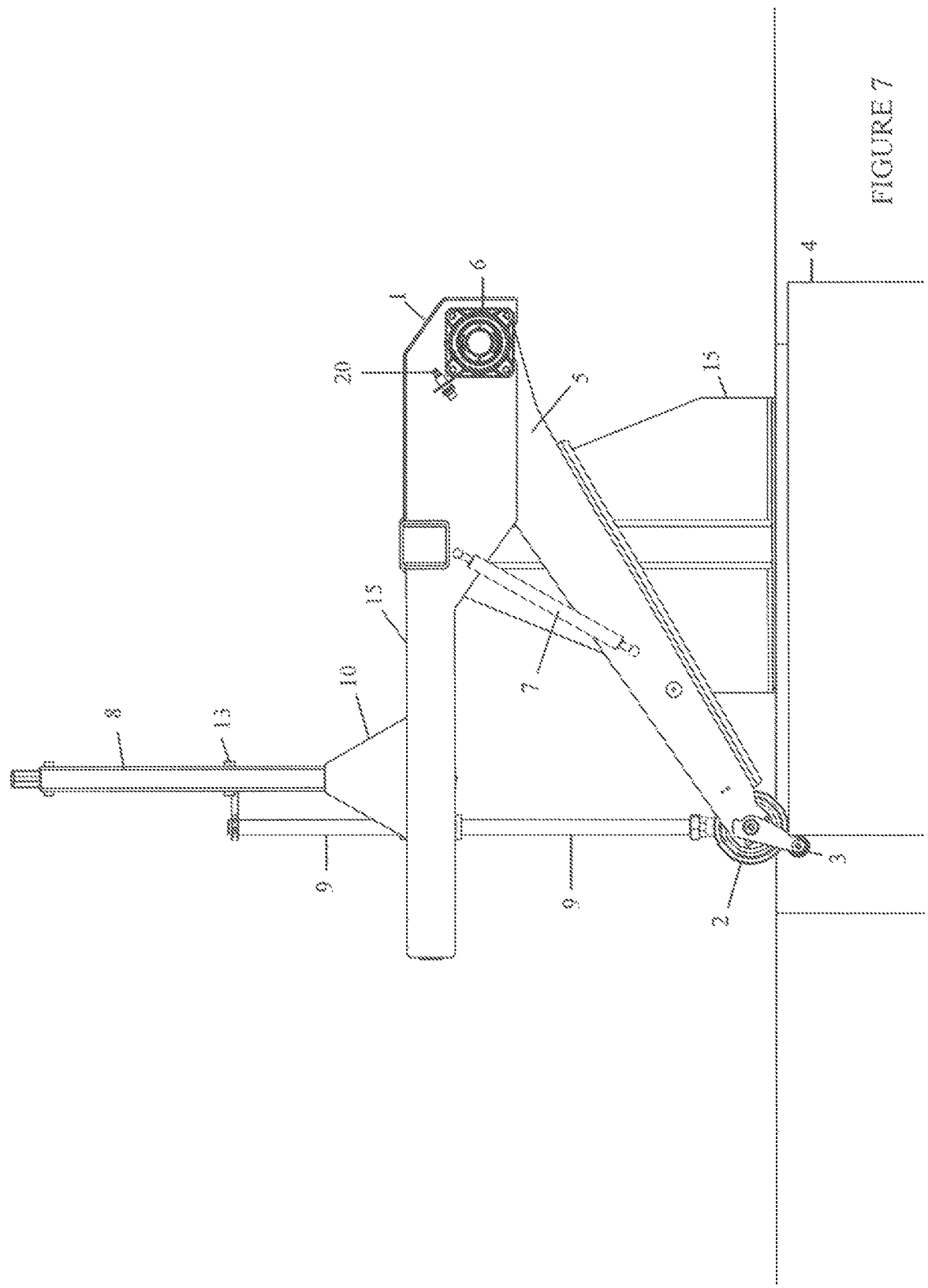

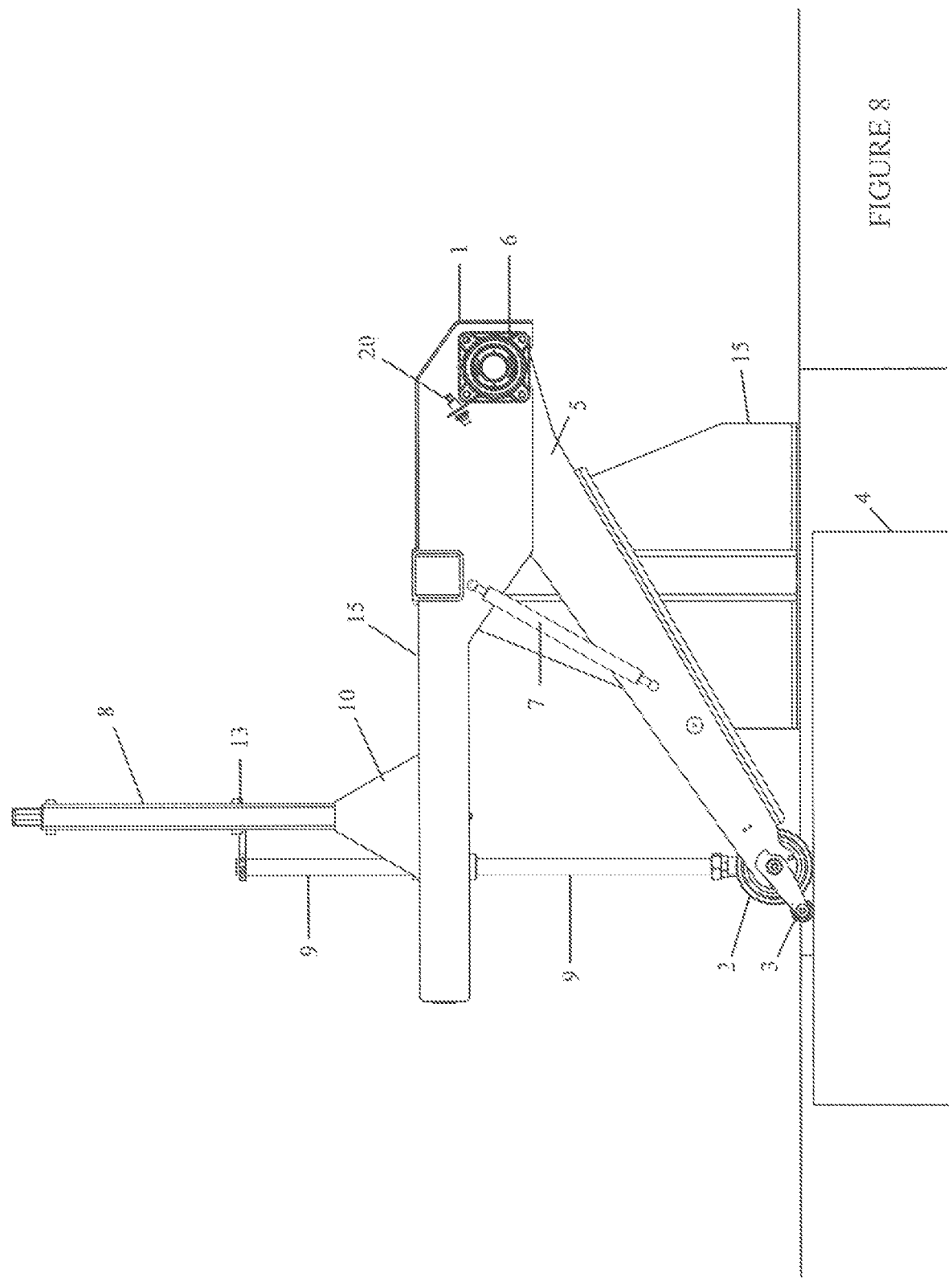

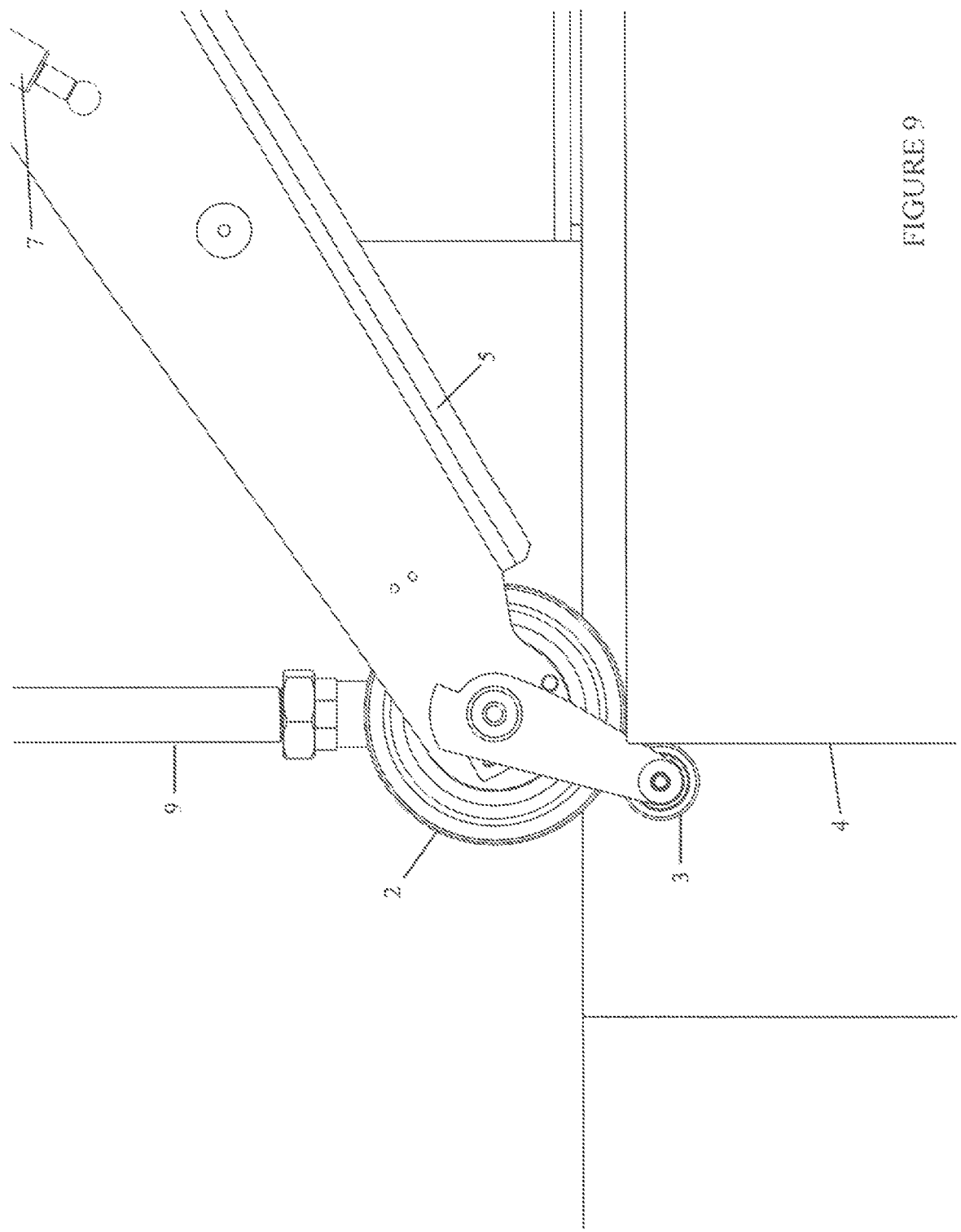

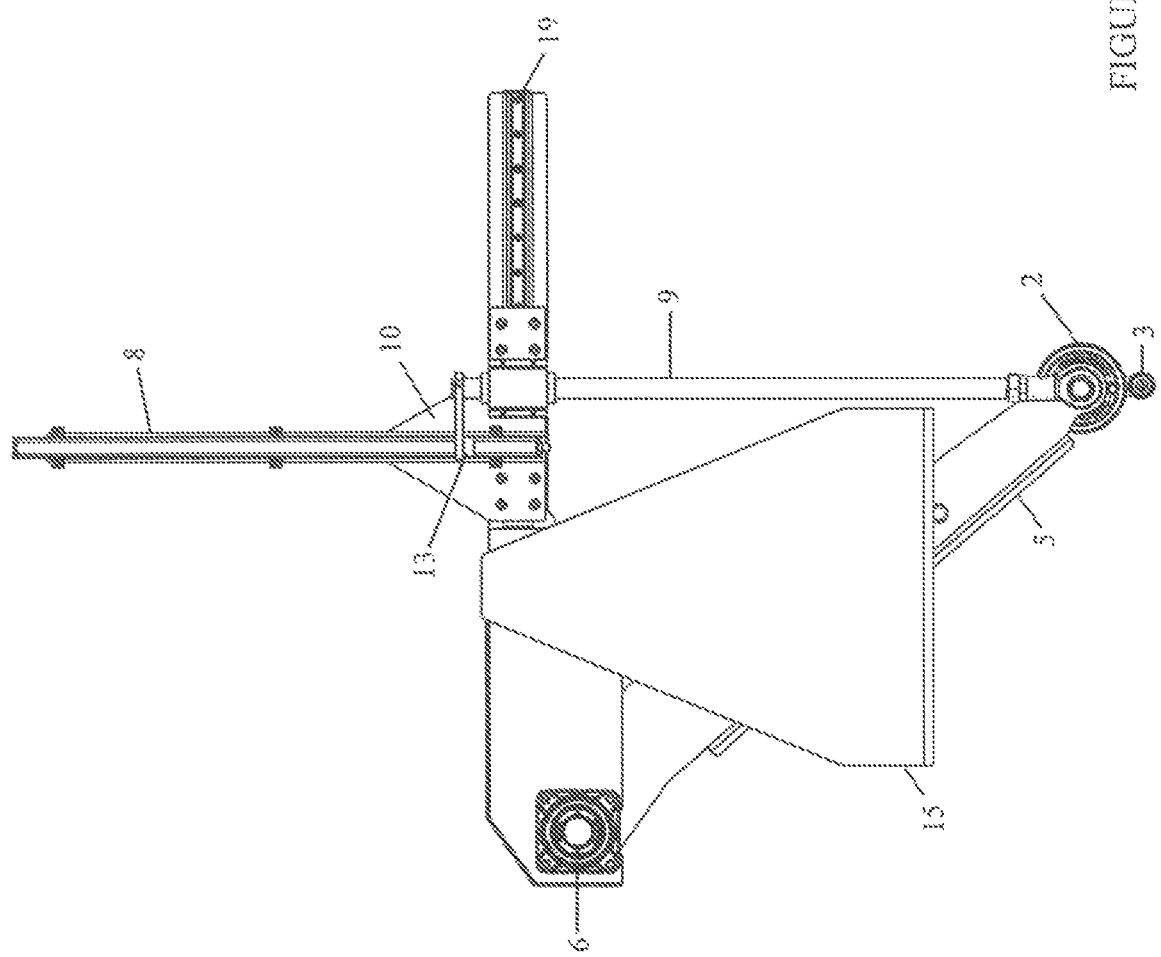

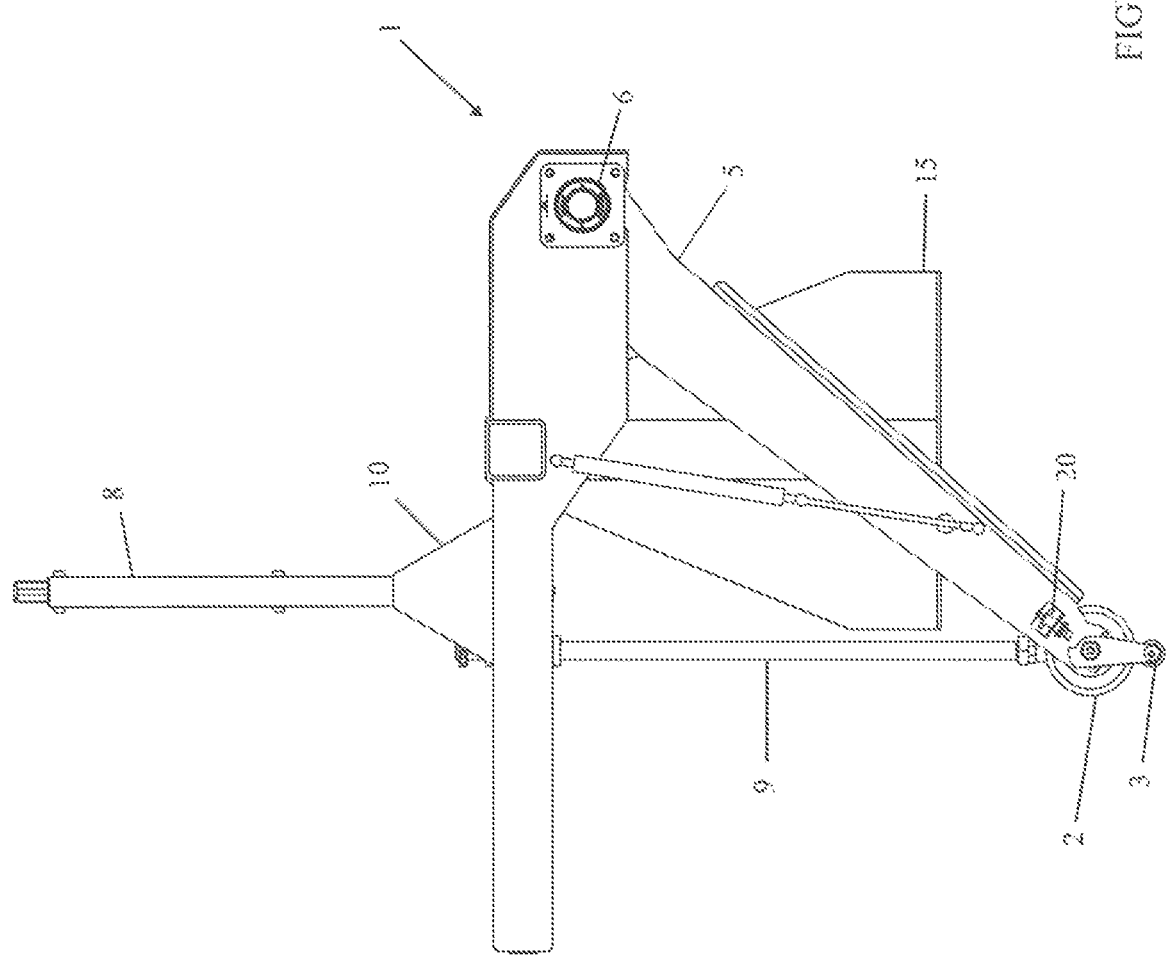

PROFILE ARM TECHNOLOGY

CROSS-REFERENCE

Figure 1:
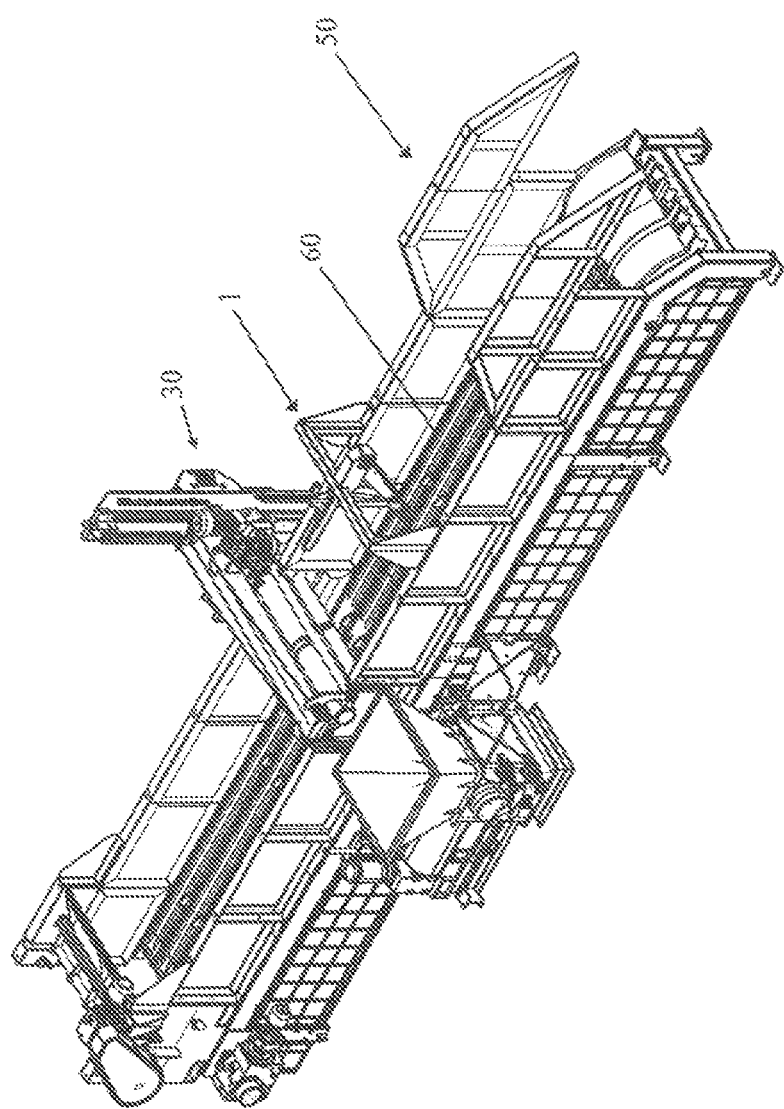

The present patent application is based upon and claims the benefit of provisional patent application No. 63/153,618, filed Feb. 25, 2021.

BACKGROUND OF THE INVENTION

Raw material used in paper production (generally cellulose or recovered paper) is often transported in pressed bales held together by wires. These wire bindings are commonly made from metal although other strapping materials may be used. The wire binding the bales must be removed before the bale reaches the manufacturing setting; however, manual removal creates risk of injury because the wire is often under tension.

The inconsistent nature of the raw material bales makes removing wires automatically difficult. These bales are created from left over or scrap material. As such, there is no uniformity in their dimensions. Two bales of the exact same size will have high spots and low spots in different locations. This requires an automatic de-wiring machine that can effectively read the topography of a bale and make the necessary corrections.

SUMMARY OF THE INVENTION

The automatic de-wiring machine uses profile arm technology to constantly record the detection of, height of, and distance of the bale, product, or part to any working device in real time. The profile arm technology uses a position tracking sensor, distance measurement, along with discrete sensors to record, calculate and store this data. The profile arm is capable of effectively reading the topography of a given product and relaying that information as needed.

The calculations and data are triggered by the part/product registration height or a change in height that is sensed by the profile arm technology. This calculated data is then stored in an array that is used to graph or define the two-dimensional profile of the product/part.

The working device is then programmed to match, or follow with an offset, the recorded two-dimensional profile of the product/part as it is fed continuously through the profile arm technology and the working device without any stoppage or pausing of automation.

The constant recording of, height of, and distance of the product allows the apparatus to adjust to inconsistencies in the height, distance or shape of the product.

While the profile arm may be applied to any number of machines, the present embodiment is employed for use in an automatic a de-wiring machine. The profile arm, when used in conjunction with a de-wiring machine, allows the winding head to adjust.

IN THE DRAWINGS

Figure 2:
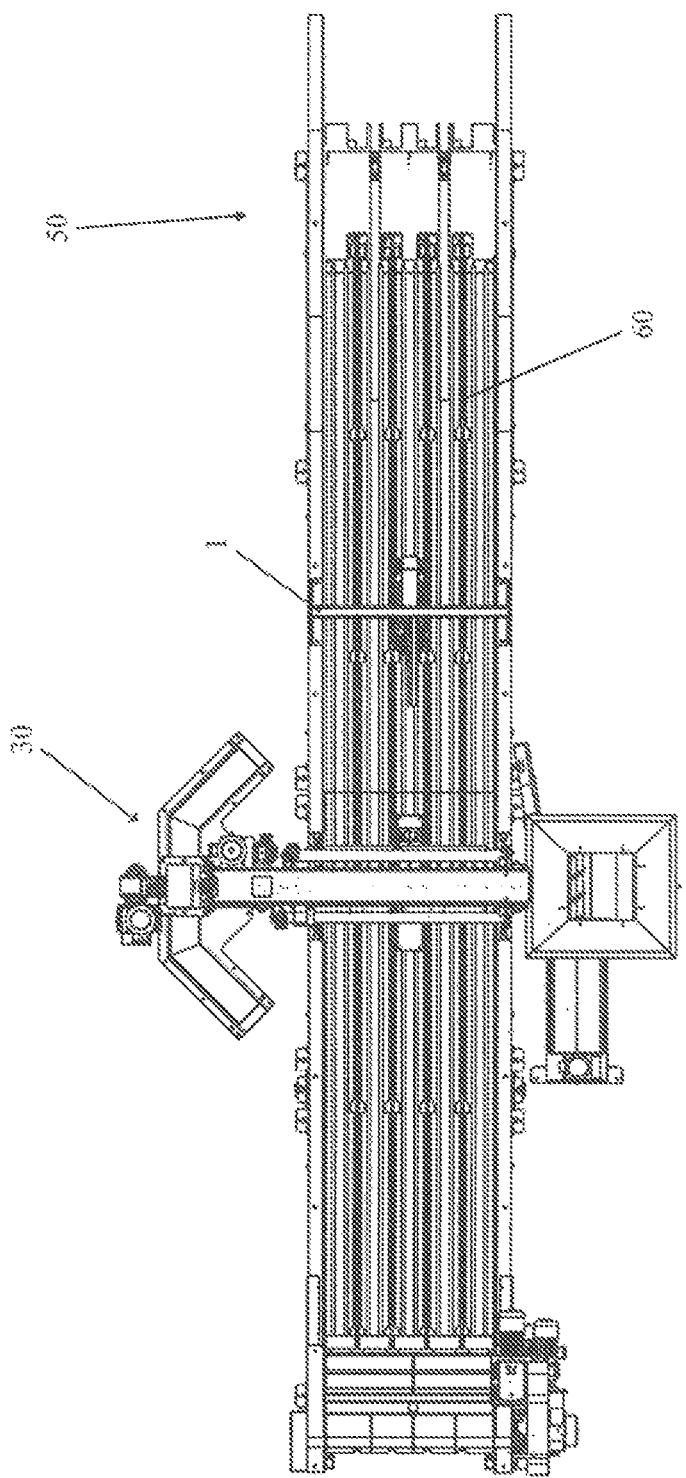
Figure 3:
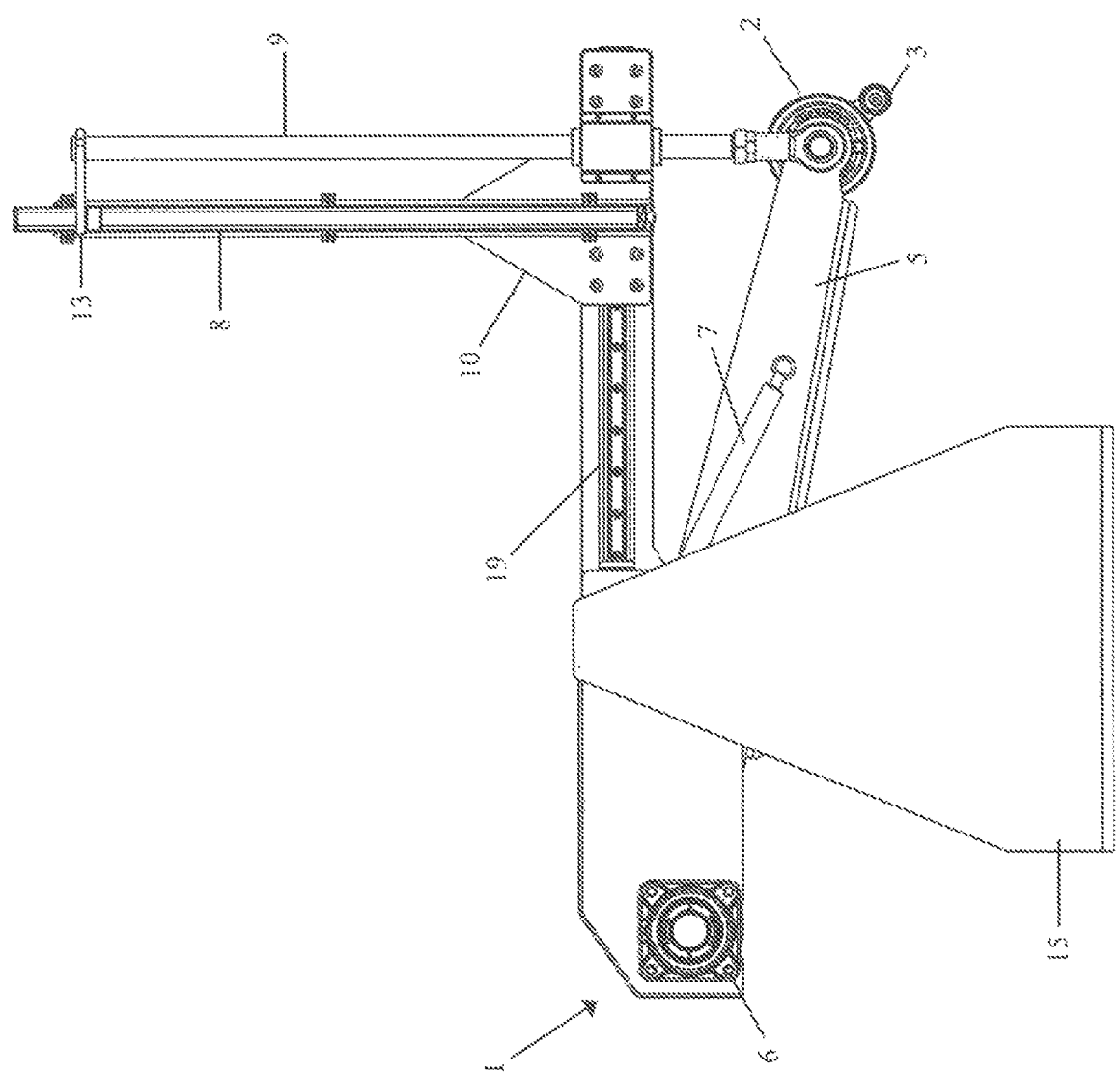
Figure 4:
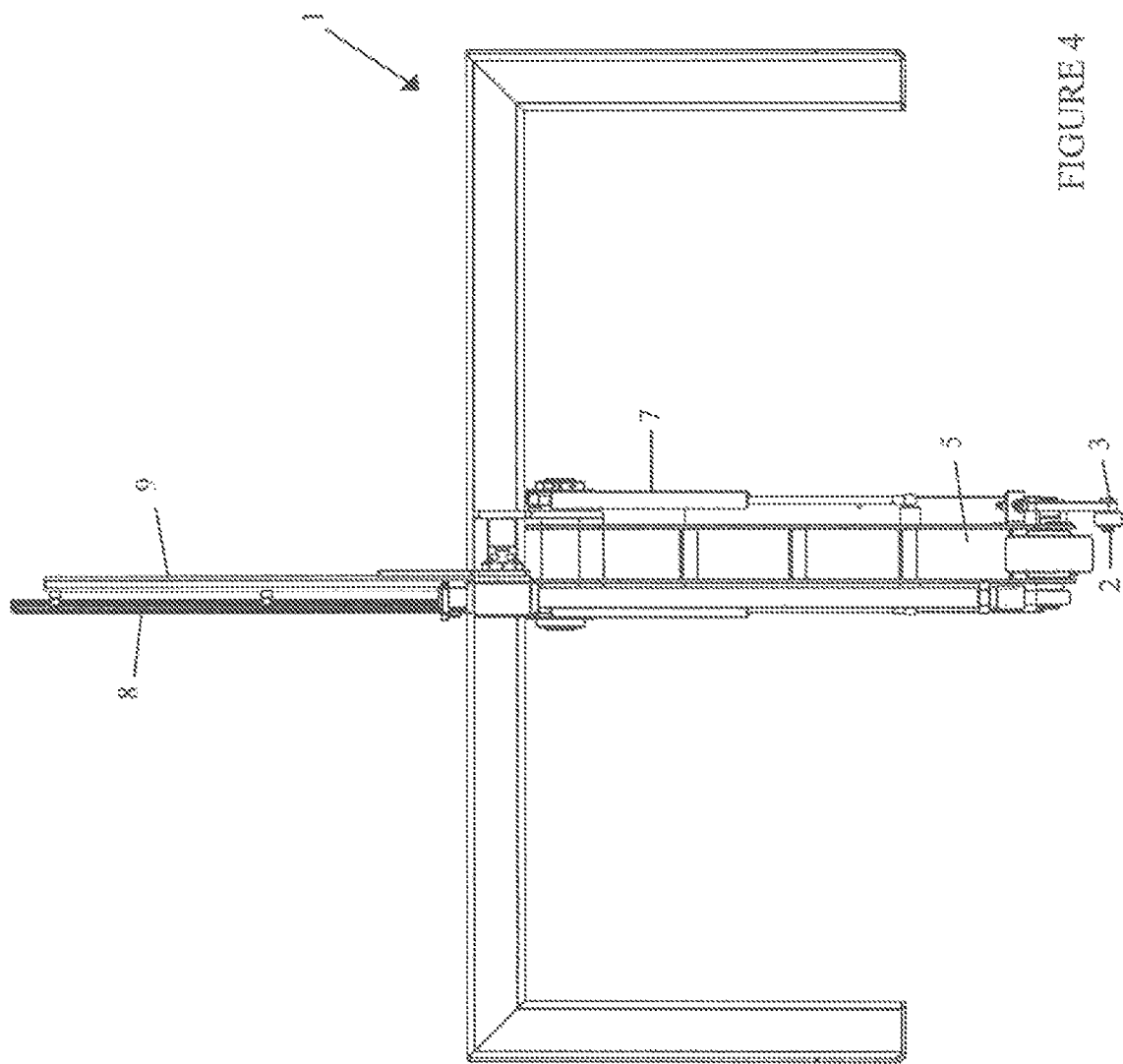
Figure 5:
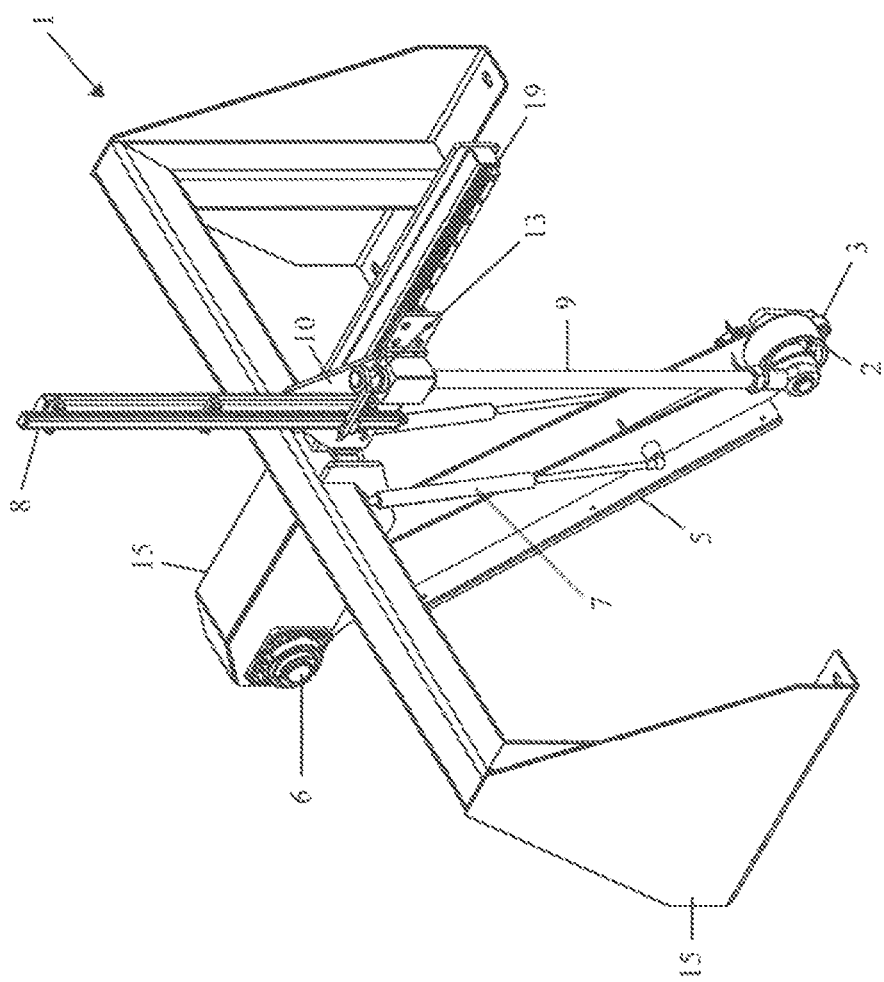

FIG. 1 is a perspective view of an automatic de-wiring machine.
FIG. 2 is a top view of an automatic de-wiring machine.
FIG. 3 is a side view of a profile arm.
FIG. 4 is a top view of a profile arm.
FIG. 5 is a perspective view of a profile arm.
FIG. 6 is a cross section view of an automatic de-wiring machine with a profile arm.
FIG. 7 is a side view of a profile arm as it engages a bale.
FIG. 8 is a side view of a profile arm fully engaged with a bale.
FIG. 9 is a side view of a profile arm as it engages a bale.
FIG. 10 is a side view of a profile arm.
FIG. 11 is a side view of a profile arm, with a proximity sensor located near the sensor arm.

DETAILED DESCRIPTION

Referring now to FIGS. 1-2, an automatic de-wiring machine 50 is shown comprising a conveyor 60, a profiling arm 1, a cutter (shown in later figures) and a wire winding apparatus 30. A bale 4 enters the automatic de-wiring machine 50 and is moved to the profile arm 1 with conveyor 60. The profile arm 1 reads and records the topography, or contour, of the bale 4, such that the winding apparatus 30 can be positioned appropriately throughout the bale 4 without missing wires or jamming into the bale.

Referring now to FIGS. 3-10, the profile arm 1 has a frame 15, a positioning arm 5, a profiling wheel 2, a sensor arm 3, a proximity sensor 20, a linear transducer 8, a profile shaft 9, a track 19, a linear transducer mount 10, a linear transducer carriage 18, and a pivot shaft 6. The sensor arm 2 provides for an up/on and down/off position. When the sensor arm 2 is in the up/on the proximity sensor 20 registers the change and relays to the linear transducer 8 which begins recording the topography of the bale. When the sensor arm 2 is in the down/off the proximity sensor 20 registers the change and relays to the linear transducer 8 which stops recording the topography of the bale.

Profile wheel is moveably connected to position arm 5 and profile shaft 9. Position arm 5 is movably connected to frame 15 via shaft 6. Frame 15 also contains track 19 that allows linear transducer mount 10 to move along frame 15 as position arm 5 is raised and lowered. Also connected to linear transducer mount 10 is a holder for profile shaft 9 which moves in conjunction with linear transducer mount 10. Attached to linear transducer mount is linear transducer 8. A linear transducer carriage 8 is movably connected to linear transducer 8. The profile shaft 9 is in communication with linear transducer carriage 13. Such that as the profile wheel 2 moves up and down to follow the topography of a bale, so does profile shaft 9. Profile shaft 9 is in communication with the linear transducer carriage 13, which moves up and down linear transducer 8. The linear transducer 8 records said movement of the linear transducer carriage 13 and therefore the movement of the profile wheel 2. The sensor arm 3 is in communication with a proximity sensor 20, the proximity sensor monitors the position of the sensor arm 3 and then relays to the linear transducer 8 when to stop and start recoding movement. In FIG. 11 the proximity sensor 20 is located near the sensor arm 3, this is the preferred embodiment.

Position arm 5 is pulled down by gravity such that the profile wheel 2 is in constant contact with the bale 4. Gas shock 7 prevents position arm 5 from crashing down once a bale has left.

When bale 4 reaches profile arm 1, via conveyor 60, the profile arm engages the bale using the profile wheel 2 and sensor arm 3. Once engaged, sensor arm 3 is moved into the up position, the proximity sensor 20 detects the change in position of the sensor arm 3, and relays to begin recording. Profile wheel 2 follows the topography of bale 4 moving up and down as the topography or contour changes. The profile shaft 9 mimics the movement of the profile wheel which is relayed to the linear transducer 8 via the linear transducer carriage 13. The linear transducer 8 records the movements of the linear transducer carriage 13 until sensor arm 3 is disengaged.

The linear transducer 8 now has a profile of the contour of a bale and relays that to a PLC (not shown). The conveyor 60 is also in communication with the PLC. The PLC is programmed to calculate the distance of the bale based on data of the distance traveled by conveyor 60, along with the topography of the bale based on data from linear transducer 8. The PLC then relays this date to the de-wirer 30. The de-wirer has a blade 40 that cuts the wire from around the bale 4. A winding head 31 spins to collect the cut wire. The winding head 31 is moved up and down to follow the contour of the bale and remove the wire. The winding head 31 is disengaged when the PLC indicates that the end of the bale has been reached.

We claim:

1. An apparatus for measuring the varying height of an object comprising, in combination, a position arm in moveable communication with a frame;

a profile wheel attached to a distal end of the position arm and in communication with a profile shaft;

the profile shaft in communication with a linear transducer capable of recording the readings of the profile wheel; and a sensor arm in communication with the linear transducer.

2. The apparatus of claim 1 wherein the profile wheel is designed to follow the varying heights of a desired object and communicating said varying heights via the profile shaft to the linear transducer.

3. The apparatus of claim 2 wherein the linear transducer records movement of the profile wheel and communicates this data to a programmable logic controller.

4. The apparatus of claim 3 wherein the programmable logic controller calculates the varying heights of the desire objects and relays the information to a desired machine.

\* \* \* \* \*